Oct. 4, 1938.  A. LANGSNER  2,132,170

TRANSIT

Filed Dec. 17, 1934  3 Sheets-Sheet 1

Inventor:
Adolph Langsner
By:- Cox & Moore, Attys.

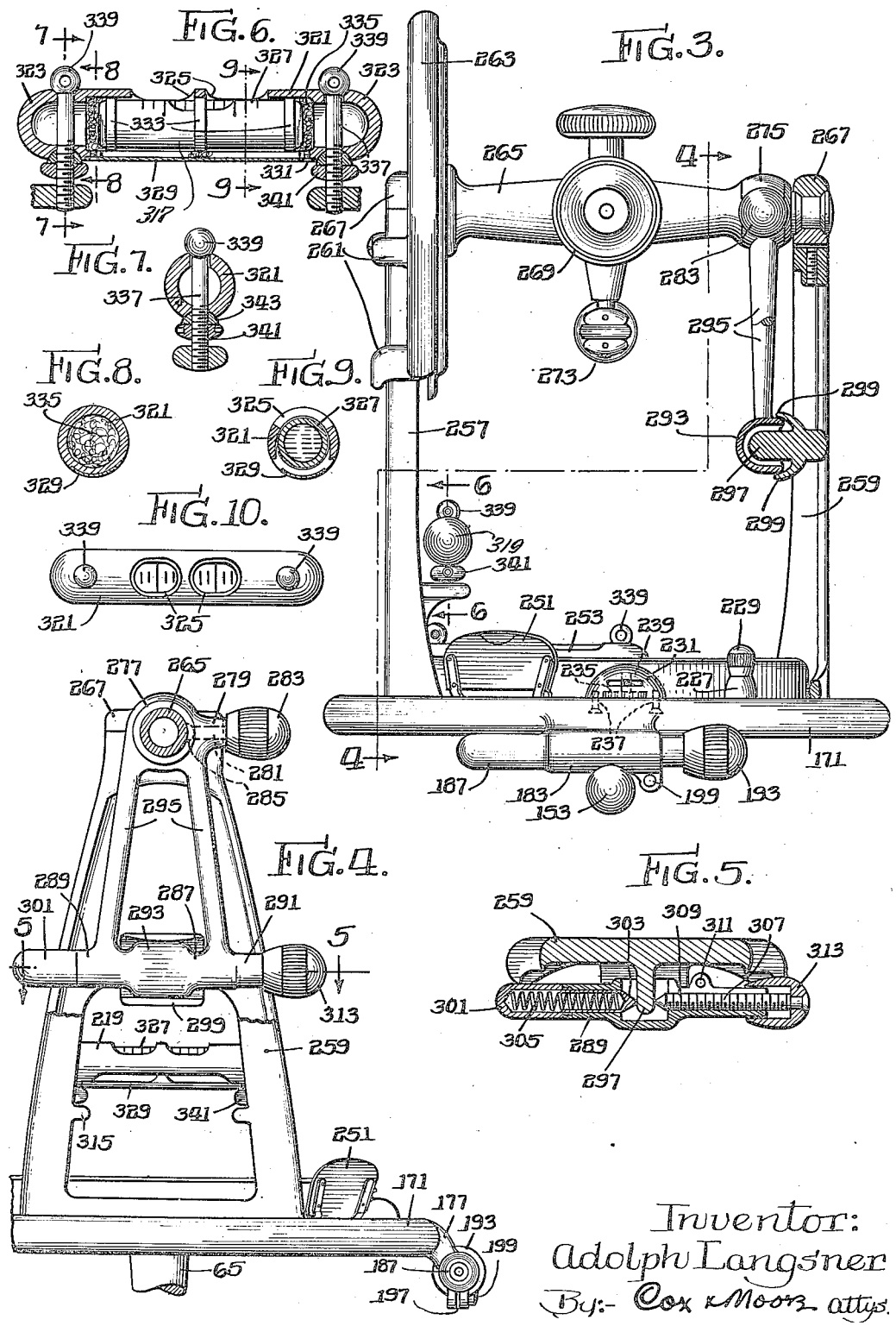

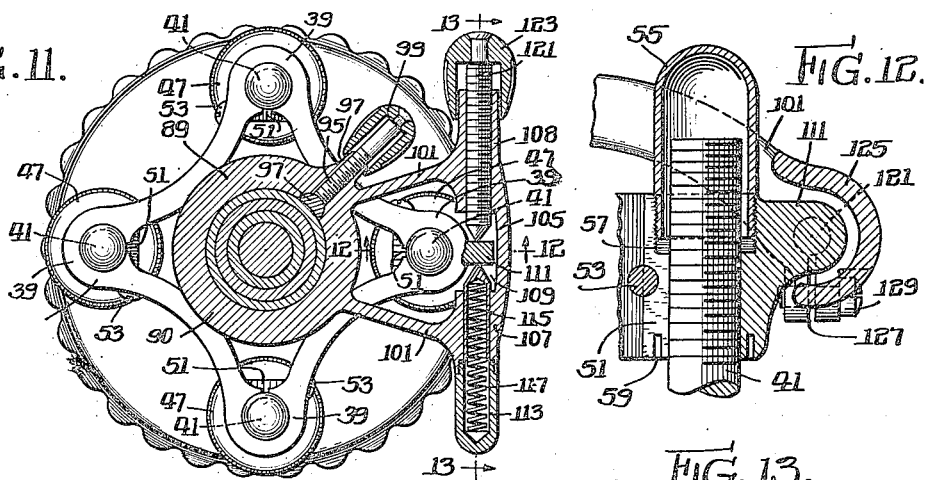

Patented Oct. 4, 1938

2,132,170

UNITED STATES PATENT OFFICE 2,132,170

TRANSIT

Adolph Langsner, Chicago, Ill., assignor to Eugene Dietzgen Company, Chicago, Ill., a corporation of Delaware Application December 17, 1934, Serial No. 757,849

7 Claims. (Cl. 33—69)

My invention relates in general to measuring instruments and has more particular reference to transits and similar precision instruments for use in surveying.

An important object is to provide an adjustable support, for a transit or other similar surveying instrument having a sighting device, such as a telescope to be supported in various adjusted positions, wherein the support contains parts designed to co-operate in excluding dirt and other foreign matter from the adjustable parts of the support; a further object being to simplify and reduce the number of parts required in the support, design the parts to facilitate assembly thereof, to impart a pleasing appearance in the assembled support and to provide a substantially streamlined configuration whereby the instrument offers minimum wind resistance and hence has improved outdoor utility.

Another object is to provide a support for a transit including a support element angularly movable on a frame, including clamp means to secure the rotatable element in angularly adjusted position on said frame, said clamp element affording means to prevent the entry of foreign matter between said support element and the frame on which it bears, and means co-operatively associated with said clamp and movable element and comprising tangent screws for accurately adjusting the relative angular position of the support element in the frame, said tangent screws being formed to impart a streamlined configuration to reduce wind resistance and providing for the substantial exclusion of foreign matter from access to the screws.

Another object is to provide a support for a transit or similar instrument having a compass plate rotatably supported with respect to a lower or variation plate, which, in turn, is rotatably supported in a main frame, including clamps and tangent screws for holding and relatively shifting the plates in the main frame wherein the clamps are arranged to co-operate with the relatively journalled parts to exclude dirt and other foreign matter therefrom.

Another object is to provide a support for a transit or similar instrument having a frame part on which the telescope is tiltably mounted including a clamp and adjustable tangent screws for securing and adjusting the telescope in a desired tilted position in the frame.

A further object is to form the tangent screw mountings to exclude dirt and foreign matter from the screws.

A further object is to form the mounting for the upper tangent screws as an integral part of the compass plate.

Another important object is to provide, in a device of the character mentioned, a clamping member comprising a frame having a thumb screw adapted to co-operate with the frame in such a way as to support the head of the thumb screw on the frame and thereby avoid damage to the screw as a result of any blow, shock, or violence to which the head may be subjected.

Another important object is to provide adjusting heads of like dust-proof construction for the tangent screws and clamps in a device of the character mentioned.

A further object is to provide a dust-proof dial-shifting gear on the dial plate of a transit.

Another important object is to provide a dust-proof compass-needle lifting device.

Another important object is to provide a compass plate for a transit having an integral dust-proof mounting for a tangent screw for adjusting the plate.

Another important object is to provide, in a transit assembly, a dust-proof tangent screw construction for the lower or limb plate, the upper or compass plate, and the telescope access clamp.

Another important object is to provide an improved spirit level housing and adjustable mounting particularly adapted for use in transits, the housing having a streamlined configuration to improve its appearance and reduce wind resistance in the instrument.

Numerous other objects and advantages of the invention will be apparent from the following description, which, taken in connection with the accompanying drawings, discloses a preferred embodiment of the invention.

Referring to the drawings:

Figure 3 is a perspective view, partially in section, of the upper portions of the transit as shown in Figure 1, viewed from the right hand side;

Figure 4 is a vertical section taken substantially along the line 4—4 in Figure 3;

Figure 5 is a horizontal section taken substantially along the line 5—5 in Figure 4;

Figure 6 is a vertical section taken substantially along the line 6—6 in Figure 3;

Figure 1:
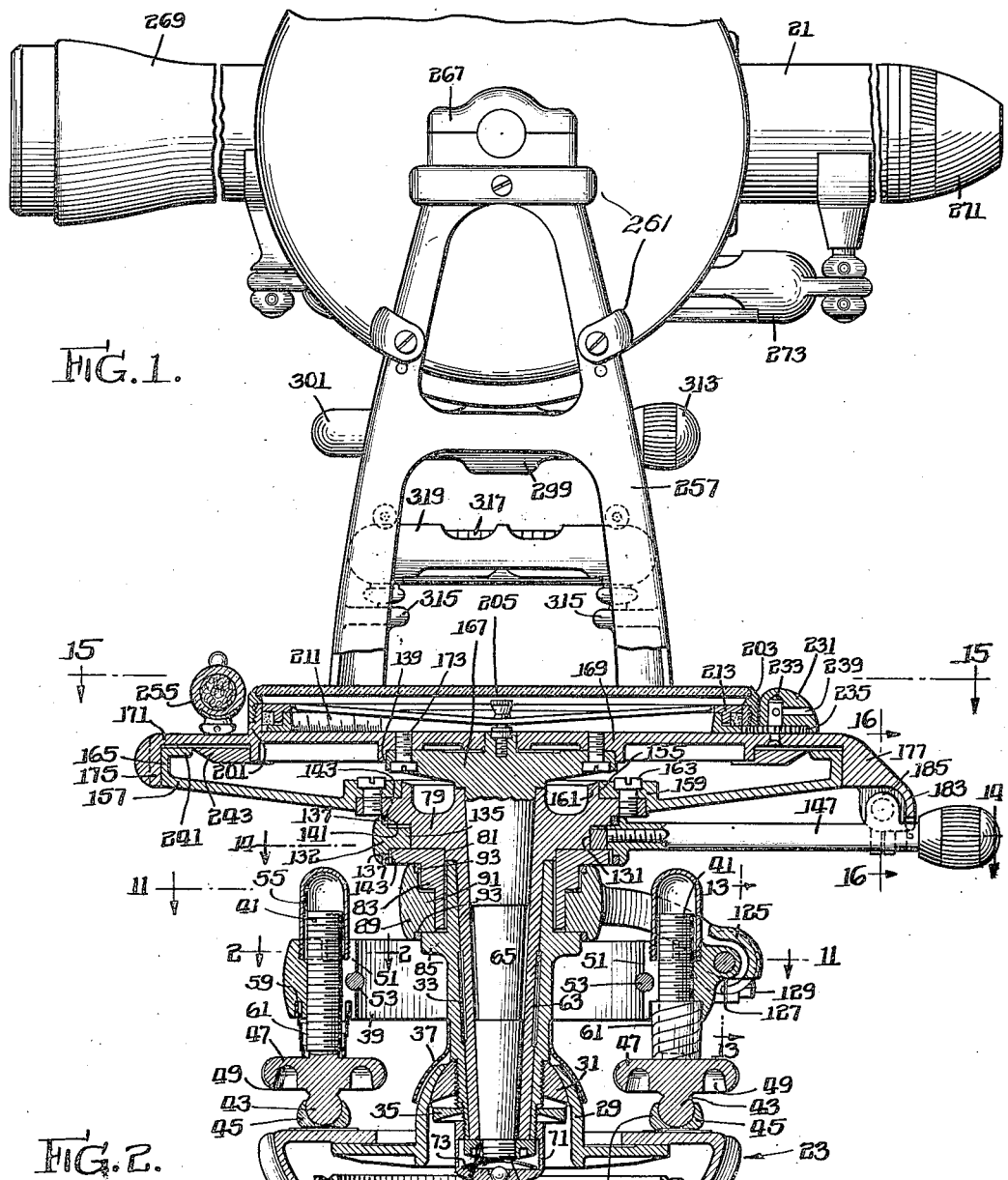
Figure 1 is a view, partially in vertical section, of a transit assembly embodying my present invention.
Figure 2:
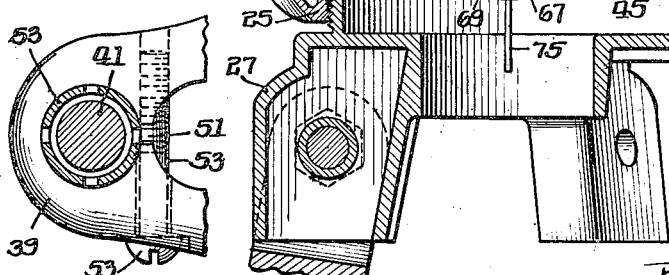
Figure 2 is a sectional view taken substantially along the line 2—2 in Figure 1.

Figures 7, 8, and 9 are vertical sections taken respectively and substantially along the lines 7—7, 8—8, and 9—9 in Figure 6;

Figure 10 is a top plan of the device shown in Figure 6;

Figure 11 is a horizontal view taken substantially along the line 11—11 in Figure 1;

Figures 12 and 13 are vertical sections taken substantially along the lines 12—12 and 13—13 in Figure 11;

Figure 14 is a horizontal section taken substantially along the line 14—14 in Figure 1;

Figure 15 is a horizontal section taken substantially along the line 15—15 in Figure 1;

Figure 16 is a vertical section taken substantially along the line 16—16 in Figure 15; and Figure 17 is a sectional view taken substantially along the line 17—17 in Figure 15 to show a modified arrangement of the parts.

To illustrate my invention, I have shown on the drawings a precision measuring instrument, namely a transit, adapted for use in surveying, although it will be obvious that many features of the invention are not necessarily restricted to transits.

The measuring instrument comprises a telescope 21 and adjustable support means for carrying the same in operative position, said support means providing for accurately adjusting the angularity of the longitudinal axis of the telescope in vertical as well as in horizontal planes in order thus to position the telescope by training the same on sighted objects, said support means being formed to measure the adjusted position of the telescope in terms of its displacement from a desired datum position.

The telescope support comprises a plate-like element 23 forming a leveling screw plate formed with preferably threaded means 25 whereby the same may be attached as on a supporting tripod 27. The plate 23 is formed with a centrally disposed upwardly projecting annular portion 29, forming a ball socket adapted to receive a ball portion 31, which is preferably threaded on a frame portion 33 forming a tapered journal. The socket-forming portion 29 may be formed as a separate element secured on the plate 23, or may be formed integral with said plate, as desired, and the ball portion 31 preferably comprises a collar threaded on the lower end of the frame 33 and secured in place by means of a lock nut 35. The ball portion 31 thus formed or fashioned on the lower end of the journal frame 33 is enclosed within the annular socket portion 29, while the frame 33 extends upwardly of said socket portion and carries an annular cover or skirt 37, which overlies the outer surfaces of the socket-forming element 29 in order to prevent foreign matter, such as dust, dirt, and atmospheric moisture from entering the journalled parts 29 and 31 and causing deterioration of the same. The journalled elements 29 and 31, however, provide for universal pivotal movement of the lower frame 33 on the plate 23. Above the skirt, the frame 33 has radially extending arms 39 carrying leveling screws 41 at their extremities. The leveling screws project above and below the arms 39 and are formed at their lower ends with balls 43 seated in sockets 45 formed on or carried by the plate 23 at or near its peripheral edge. The sockets 45 preferably comprise cup-shaped elements having their bottoms secured to the upwardly facing surfaces of the plate 23, said cup-shaped elements being peened at their upper edges around the balls 43 in order to secure the same in these sockets.

The leveling screws are preferably formed with substantially disk-like portions 47, which extend outwardly of the screws intermediate the balls 43 and the portions 41, which are threaded into and through perforations formed in the extremities of the arms 39. The peripheral edges of the portions 47 are or may be rounded to reduce wind resistance and to impart a stream-lined appearance and may be knurled, as shown, to facilitate manipulation of the same. The under surface of the disks also may be relieved as by providing the same with annular grooves 49 in order to reduce their weight. The arms 39 also may be of skeletal construction as shown in Figure 11 in order to reduce the weight of the same. Each arm is preferably provided with a slot 51 extending radially of the openings in which the screws are threaded and a tightening screw or other clamping means 53 is provided by which the screws 41 may be secured in adjusted position in said openings.

I prefer also to provide dust-caps 55 for enclosing and protecting the ends of the screws 41, which project above the arms 39, said dust-caps comprising preferably spun sheet metal shells having upper closed and preferably rounded ends, said shells having open ends adapted to thread into sockets 57 formed in the upper surface of the arms 39 around the projecting ends of the screws. The covers 55 are also preferably provided with longitudinal slots at spaced intervals in the edges defining the open end thereof so that resilience of the cover may be utilized to hold the same in place no matter how tightly the clamping screws 53 are set. In other words, the covers 55 are snugly held in the sockets 57 even when the clamping screws 53 are released to permit the leveling screws 41 to be turned in the arms 39. The undersides of the arms are also provided with annular channels 59 around the openings, through which the screws 41 project downwardly of said arms and a sheet metal cover 61, comprising preferably a spirally wound expansible tube, is arranged about each leveling screw to enclose the portions of the same, which project downwardly of the arms. Each expansible cover seats at one end in a groove 59 and snugly bears at the opposite end against the surface of a disk 47. By means of the dust-caps 55 and the expansible covers 61, the portions of the adjusting screws 41, which otherwise would be exposed, are at all times shielded and protected from deterioration due to atmospheric dirt and moisture.

The frame 33 provides a journal for rotatably carrying the telescope 21 and certain intermediate telescope supporting devices, which function to measure the horizontal and vertical displacement of the axis of the telescope from a desired datum position. It will be understood that the leveling screws and co-operating elements associated with the frame 33 are for the purpose of adjusting, to a vertical position, the axis of the journal provided by said frame before sighting the telescope and making the measurements determined by said sighting. The journal provided by the frame 33 rotatably receives and supports a sleevelike element 63, which, in turn, rotatably receives and supports a tapered spindle 65 so that the spindle 65, sleeve 63, and the journal provided by the frame 33 have co-axial concentric relationship and are each relatively rotatable with respect to the other.

The spindle, sleeve and journal, at their lower ends, are substantially co-terminous although the spindle has a projecting end 67, which is threaded to receive a nut 69, which overlies the lower ends of the sleeve 63 and the journal 33 in order to hold the parts together and prevent access of dirt through the lower ends of said sleeve and journal. The lower end of the journal is also preferably threaded to receive a cover cap 71 carrying a resilient spring 73 adapted to press upwardly on the lower end of the spindle. The cover cap 71 also provides means for supporting the upper end of a plumb line 75.

The upper end of the sleeve 63 projects upwardly of the bearing 33 and is provided with a head 79, which overlies and rides on the upper end of the journal 33. This head provides a seat 81 for receiving the upper portion of a clamping ring 83, the lower portions of which encircle the upper end of the bearing 33 above an annular outwardly projecting ridge 85 formed on said bearing member. The clamping ring 83 is also formed to receive a clamp 89 comprising an annular portion 90 encircling the clamping ring 83 and having a tongue 91 fitting into a groove in said ring. The annular portion of the clamping element 89 also has flanged portions overlying the peripheral edge of the ridge 85 and a remote portion of the clamping ring 83, resilient gaskets 93 being preferably arranged between said flanged edges of the clamping element 89 and the parts which said edges overlie in order to prevent the entrance of dirt and moisture within the clamping element.

The clamping element 89 carries a clamping member comprising a screw threaded shaft or screw 95 having an inner end engaging a bearing block 97 in position to bear upon the clamping ring 83 in order, when the shaft 95 is screwed home, to lock the clamping element 89 and the clamping ring 83 against relative rotation. The clamping screw 95 has an end projecting outwardly of the annular portion of the clamping element 89 preferably through an embossment 97 formed thereon, and the projecting end of the screw is provided with a turning knob 99 preferably of cup-shaped form and adapted to embrace the embossment 97 in order to protect the projecting portions of the screw against deterioration by access thereto of dirt and atmospheric moisture. The edges of the cup-shaped member also preferably engage the outer surfaces of the embossment 97 snugly so that accidental blows and other forces applied on the knob may be transferred to the clamping element 89 to said embossment 97 and thus protect the screw against deformation, bending or other injury. The outer surfaces of the knob are preferably formed to a stream-lined configuration, the knob preferably having the shape of a tear-drop in order to improve its appearance and reduce wind resistance in the instrument.

The annular portion forming the clamp element 89 is formed with a tangent adjusting screw support frame comprising projecting arms 101, the extremities of which are connected together to form a tangent screw support frame 105. The tangent screw supporting frame 105 comprises a pair of spaced apart portions forming journals 107 and 108 in co-axial alignment with a space 109 between the opposing facing ends of said journals. In this space 109 is received a projection 111 comprising a finger formed on one of the arms 39 of the frame 33. The outwardly facing end of the journal 107 carries a cover 113 comprising a shell closed at one end and formed to provide a rounded or streamlined configuration, the opposite open end of the shell being threaded into the end of the journal. The shell 113 and the journal, on which it is mounted, enclose a pintle element 115 having a point projecting through the open end of said journal 107 in position to bear upon one side of the finger 111 in the space 109. The pintle element 115 is preferably hollow and fits snugly into the journal 107 to form therewith and with the shell 113 a closed expansible housing containing spring means 117 operating to yieldingly urge the pintle element into the opening 109 and against the finger 111. It will be seen that the foregoing arrangement will substantially prevent the entrance of dirt and moisture into the expansible housing enclosing the spring 117, which is thus protected against deterioration by the co-operation of the pintle and the shell. The other journal 108, comprising a part of the frame 105, is internally threaded to receive a threaded shaft 121 having a pointed end extending in the opening 109 in position to engage the side of the finger 111 opposite from the pintle 115. The shaft 121 has an end extending outwardly of the journal 108 and carries a preferably cup-shaped knob 123 of construction similar to the knob 99, previously described, the knob 123 having edges adapted to snugly engage the outer surface of the boss 119 to prevent access of foreign matter to said threaded shaft 121 and also to protect the same from damage due to blows or other forces which may be accidentally applied to the knob 123. The frame 105 is also formed with an integral cover portion 125 extending between the facing ends of the journals 107 and 108 and serving to substantially enclose the space 109 above, outwardly of and below the finger 111. If desired, the frame portion, forming the journal 108, may be split longitudinally as shown at 127 in Figure 1, and a clamping element 129 applied in order to clamp the split parts together upon the threaded shaft 121 in order to lock the same in adjusted position. It will be seen that the pintle 115 and the threaded shaft 121 may be utilized to accurately adjust the angularity of the clamping element 89 with respect to the supporting frame including the portions 33 and the arms 39.

The upper end of the sleeve 63 projects above the clamp ring 83 and is provided with an annular shoulder 131 adapted to receive a second clamp 133 having a central tongue 135 adapted to ride on the shoulder 131 and lateral edges 137, one of which overlies the annular portion 139 of the clamping ring 83 and the other of which overlies a shoulder 141 formed in the portion 79 of the sleeve 63. If desired, the overlying edges of the clamp 133 may carry resilient washers 143 similar to the washers 93 of the lower clamp 89 for the purpose of preventing dirt from entering between the clamping shoulders 139 and 141. The clamp 133 is shown in Figure 14 and comprises an annular portion 145 adapted to encircle the shoulder 131, and a radially projecting sleeve 147 formed integral with the annular portion 145 and adapted to receive a clamping screw 149 extending in the channel and fastened to the sleeve 147 from the remote end thereof and opening on the inner annular surface of the tongue 135. The inner surface of the tongue is relieved at the inner end of the channel in which the screw 149 is carried in order to receive a bearing element 151, upon which the inner end of the screw 149 presses in order to force the bearing member against the annular surface 131 in clamping the sleeve 63 against relative rotation with respect to the ring 83. The screw 149 is threaded in the sleeve 147 and has an end projecting outwardly of the outer end of said sleeve and carries a preferably cup-shaped knob 153 of construction similar to the knobs 99 and 133 previously described, the knob 153 having edges adapted to snugly engage the outer surface of the sleeve 147 in order to prevent access of foreign matter to the threaded screw and also to protect the same from damage due to blows or other unusual forces accidentally applied to the knob 153.

Upwardly of the clamping shoulder 131, the sleeve 63 is formed with an annular seat 155 adapted to receive a closure plate 157 having a central perforated portion 159 formed to engage and rest upon the seat 155 there being an annular ridge 161 formed on the sleeve member 63 to engage the centrally perforated edges of the plate 157 in order to align the same with respect to the axis of the sleeve. The plate 157 is held upon its seat 155 in any suitable fashion as by means of the fastening studs 163. The outer edges of the plate 157 are preferably circular and flanged as at 165 for a purpose to be hereinafter more fully explained. The upper end of the spindle 65 extends upwardly of the sleeve 63 and is formed with an enlarged head 167 adapted to fit into a seat 169 formed in the underside of a compass dial plate 171, which is carried by and supported on the head 165 and secured in place preferably by means of fastening studs 173. The plate 171 extends at its peripheral edges opposite the flanged edges 165 of the closure plate 157 and the compass plate 171 has a dependent flange 175 snugly receiving the flanged portion 165 of the plate 157. If desired, resilient dust-excluding means 166 may be arranged between the interfitting flanges 165 and 175, as shown in Figure 17, to exclude dust from entering between the interfitted flanged portions of the plates 157 and 171.

The plate 171 also, at its peripheral edge, is formed with an integral outstanding portion 177 forming a tangent screw mounting comprising, as shown in Figure 16, a pair of spaced-apart dependent journals 179 and 181 and an integral cover 183 bridging the space between the facing ends of the journals. The sleeve 147 of the clamp 133 extends below the tangent screw mounting 177 and is formed with an upstanding finger 185 in position extending between the facing ends of the journals 179 and 181. The outwardly facing end of the journal 181 carries a cover 187 comprising a shell closed at one end and formed to provide a rounded or stream-lined configuration, the opposite open end of the shell being threaded into the end of the journal 181. The shell 187 and the journal, on which it is mounted, enclose a pintle element 189 having a point projecting through the journal 181 in position to bear upon one side of the finger 185. The pintle element 189 is preferably hollow and fits snugly into the journal to form therewith and with the shell 187 a hollow expansible housing containing spring means 191 operating to yieldingly urge the pintle element against the finger 185. It will be seen that the foregoing arrangement will substantially prevent the entrance of dirt and moisture into the housing enclosing the spring 191, which is thus protected against deterioration by co-operation of the pintle 189 and the shell 187. The other journal 179 is internally threaded to receive a threaded shaft 195 having a pointed end extending in position to engage the side of the finger 185 opposite from the pintle 189. The opposite end of the shaft 195 extends outwardly of the journal 179 and carries a preferably cup-shaped knob 193, similar to the knobs 99, 123, and 153 previously described, the knob 193 having edges adapted to snugly engage the outer surface of the journal 179 to prevent foreign matter from entering therebetween to the threaded shaft and also to provide a mechanical bearing to protect the shaft against distortion or other damage due to shaft bending forces accidentally applied to the knob at the outer end of the shaft. If desired, the frame portion, forming the journal 179 may be split as shown at 197 and a clamping element 199 applied in order to clamp the split parts together upon the shaft 195 in order to lock the same in adjusted position. It will be seen that the pintle 189 and the threaded shaft 195 may be utilized to accurately adjust the relative angular position of the plate 171 with respect to the clamp 133 by merely turning the knob 193.

The upper surface of the plate 171 is formed with an annular ridge 201, which is externally threaded to receive a cover 203, comprising an annular ring forming a supporting and strengthening rim for a preferably circular transparent cover plate 205 adapted to overlie the space enclosed by the rim 201. Within said space is mounted a ring 207, the outer surface of which is provided with gear teeth 209 and the inner surface of which is formed with a graduated scale 211. The ring 207 carries a second ring 213 adapted to bear against an outwardly facing shoulder on the ring 207 and also upon the inner surface of the ridge 201 in order to maintain the ring 207 in axial alignment with the axis of the spindle 65. The upper surface of the plate 171 within the graduated ring 207 is formed with a graduated scale 215 adapted to register with the scale 211 formed on the rim. The surface of the plate 171 also may be formed with compass indicia 217. The plate 171 also carries a compass needle 219 mounted on a pivot 221 at the axis of the spindle 165 and means, comprising a lever 223 pivoted as at 225 for movement in a vertical plane is provided for lifting the compass needle 219 from its pivot whenever the transit is not in use. The compass lifting needle may be of any suitable or preferred construction and has an end extending outwardly of the ridge 201 in position to engage a manually operable screw threaded in a boss 227 (Fig. 3), preferably integral with the plate 171. The screw projects from the boss at its upper end and is formed with a preferably cup-shaped knob 229 of construction generally similar to that of the knobs 99, 123, 153 and 193 heretofore described and adapted in similar fashion to protect the threaded screw from damage and deterioration.

Dust-proof means is provided for relatively rotating the ring 207 from a point outside of the closure defined by the ridge 201. To this end, the plate 171 carries a dome-like housing 231 containing a stub shaft 233 and a gear 235. The ridge 201 is slotted opposite the housing 231 to permit the rim of the gear 235 to extend therethrough in position engaging the teeth 209 on the ring 207 so that by turning the shaft 233 the ring 207 may be rotated. The housing 231 is formed to snugly engage the outer surfaces of the ridge 201 at the opening through which the gear extends and the housing 231 also entirely encloses the portions of the gear 235 which are positioned outwardly of the ridge 201. The housing 231 may be secured on the plate 171 by preferably threaded fastening means 237, which extend through the plate 171 from the bottom side thereof. In order to turn the shaft 233, the same is or may be provided with diametral perforations and the housing 231 is provided with a wedge-shaped slot 239 through which a pin may be inserted for engagement in the perforated portions of the shaft for the turning of the same.

The flange 165 of the plate 159 has an inwardly extending portion 241 underlying the marginal portions of the plate 171 and the plate 171 carries a scale plate 243, the outer edges of which register with the inner edge of the scale-carrying portion 241. Circumferential scales 245 and 247 are formed respectively on the portions 243 and 241 and the plate 171 is formed with upwardly facing openings preferably fitted with a transparent covering pane on opposite sides of the compass housing in order to permit said scale to be viewed through said opening. To render the scale highly visible, the plate 171 may carry reflectors 251 on suitable hinges adapted to normally overlie the opening 249 and protect the cover pane when the instrument is not in use, said reflectors 251 being swingable to extended positions wherein the same may reflect sky shine through the openings 249 onto the scales 245 and 247. The plate 171 also provides a mounting for a vial housing 253 containing a spirit level vial 255. The vial 255 and its housing 253 are preferably similar to the vial 317 and housing 319 and preferably has adjustable support means as shown in Figures 6 through 10 and hereinafter more fully described. The compass plate 171 carries a pair of telescope supporting standards 257 and 259 preferably in the form of A members extending upwardly therefrom on opposite sides of the compass housing, one of these standards 257 carries a guard 263 removably secured thereto as by means of the fastening lugs 261. The standards 257 and 259 also carry pivot means 265 therebetween, said pivot means being journalled at its opposite end in bearings 267 carried by the standard. The pivot means 265, in turn, carries a telescope 269 of any suitable character and preferably formed with the usual stadia wires. The pivot means enables the telescope to be tilted to a desirable angle as is well known in the art of surveying and the axle also carries a wheel within the guard 263, said wheel having an annular rim provided with a circular scale or scales by means of which the tilted position of the telescope may be measured by reading the scale opposite an index mark formed or carried by the frame 263.

In my co-pending application, Serial Number 725,494, filed May 14, 1934, I have shown a guard and graduated wheel of the character suitable for use in the transit of my present invention and since the particular construction of the wheel and guard forms no part of the present invention except for the curved configuration of the peripheral portions of the guard 263, whereby to eliminate wind resistance, I have shown the guard and wheel in a diagrammatic fashion.

The telescope 269 also may be of any suitable or convenient form although I prefer to utilize a telescope of the character shown in my co-pending application, Serial Number 751,242, filed November 2, 1934, wherein the telescope comprises an adjustable eye piece 271 of substantially bullet-nose configuration for the purpose of minimizing wind resistance and to improve the appearance of the telescope. The barrel of the telescope also provides an adjustable mounting for a spirit level 273 preferably of the type shown in my co-pending application, Serial Number 751,241, filed November 2, 1934.

In order to provide for accurately tilting the telescope between the frame members 257 and 259 and to secure the telescope in tilted position, the axle 265 carries a clamp 275 comprising an annular portion 277 encircling the axle and formed with a radial embossment 279, into and through which a shaft 281 is threaded. The outer end of the shaft carries a preferably cup-shaped thumb nut 283, which is preferably similar to the previously described elements 99, 123, 153, and 193, and which embraces the outer surfaces of the projection 279. The inner end of the threaded shaft 281 is adapted to engage a crescent shaped bearing block 285 similar to the blocks 97 and 151, and which, when the screw 281 is tightened, is adapted to bear upon the axle 265 in order to secure the axle and the clamp together. By loosening the screw 281, the telescope may be rotated approximately to a desired angular position, after which the telescope is clamped by rotating the nut 283 in order to tighten the clamping screw 281. The telescope may then be accurately adjusted by means of the tangent adjustment screw device shown in Figure 5, and which comprises a frame 287 providing a pair of spaced journals 289, 291, and an intermediate portion 293 forming a cover enclosing the space between the facing ends of the journal. The frame 287 is connected with the annular clamp portion 277 by means of arms 295, which are preferably integral with the portion 277 and the frame 287. The frame 259 is preferably formed with an outstanding portion 297, which extends within the cover 293 between the facing ends of the journals 289 and 291, the frame also being formed with projecting lips 299 above and below the finger 297, which lips are adapted to co-operate with the edges of the cover 293 in order to provide a substantially dust-proof housing for the finger 297 between the journals. The outer end of the journal 289 preferably carries a cover 301 comprising a shell closed at one end and formed to provide a preferably rounded or streamlined configuration, the opposite open end of which is threaded into the end of the journal. The shell 301 and journal 289 enclose a pintle element 303 having a point projecting through the journal in position to bear upon one side of the finger 297. The pintle element 303 is preferably hollow and snugly fits the journal to form therewith and with the shell 301 a hollow expansible housing containing spring means 305 adapted to yieldingly urge the pintle against the finger 297. It will be seen that the foregoing arrangement will substantially prevent the entrance of dirt and moisture into the spring housing, the spring 305 thus being protected against deterioration. The other journal 291 is internally threaded to receive a threaded shaft 307 having a pointed end extending in position to engage the side of the finger 297 opposite from the pintle 303. The opposite end of the shaft 307 extends outwardly of the journal 291 and carries a preferably cup-shaped knob 313, similar to the knobs 99, 123, 153, 193, and 283 heretofore described, said knobs 313 having edges adapted to snugly engage the outer surface of the journal 291 to protect the shaft 307 from mechanical damage and from deterioration due to the access thereto of foreign matter. If desired, the journal 291 may be split as at 309 and a clamping element 311 applied to secure the split parts together upon the shaft 307 and thus lock the same in adjusted position. It will be seen that the pintle 303 and the threaded shaft 307 may be utilized to accurately adjust the relative angular position of the clamping frame with respect to the upright 259, in which the telescope supporting axle 265 is journalled, so that when the clamp screw 281 is tight on said axle, the angular position of the axle and, therefore, of the telescope 269 may be accurately adjusted by means of the tangent screw 307.

The frame member 257 is also formed with a pair of spaced seats 315, on which a spirit level comprising a vial 317 and a housing 319 may be adjustably mounted. The vial, vial housing, and mounting means may be and preferably are identical to the vial and housing 255, which is carried by the compass plate 171 and are shown in Figures 6 through 10. The vial housing comprises a preferably sheet metal cylindrical casing 321, the opposed ends 323 of which are preferably rounded to improve appearance and reduce wind resistance. The upper surface of the housing is provided with a pair of openings 325, through which the upper preferably graduated surfaces 327 of the vial are visible. The vial is assembled in the casing through an elongated opening in the underside thereof, which opening is closed by means of a cover 329 secured in place by fastening devices 331 at opposite ends of the cover. The vial may be provided with annular bands 333 of resilient material to afford shockless mounting of the vial within the housing and suitable resilient packing 355 is arranged in the opposite ends of the housing for yieldingly supporting the vial therein against longitudinal movement.

The housing is supported on the plate 171 or the spaced ledges 315 as the case may be by means of pins 337, which penetrate the ends of the housing. The pins 337 have preferably spherical heads 339, which rest in spherical sockets formed in the upper surface of the vial housing, the lower ends of the pins being threaded and extending in sockets formed in the ledges 315 or the plate 171 as the case may be. The threaded portion of the pin below the housing carries locking nuts 341 and self-adjusting collars 343, said collars having flattened surfaces bearing on the nuts 341 and spherical surfaces seating in corresponding depressions formed in the lower surface of the vial housing. It will be obvious that either end of the vial housing may be adjusted vertically by merely loosening the nut 341 and turning the shaft 337 in order to raise or lower the head 339 with respect to the base on which the spirit level is mounted. When the pin has been adjusted to a desired elevation, the nut 341 may be tightened to secure the vial housing snugly between the head 339 and the adjusting washer 343.

It will be seen that the entire transit is of dust, dirt and moisture-proof construction to the end that all of the operating parts are concealed and protected against access of foreign matter, which may deteriorate the same.

Another important feature resides in utilizing the cup-shaped knobs 99, 123, 153, 193, 283, and 313 in co-operation with the sleeves, in which the screws on which the knobs are mounted extend in order to prevent mechanical damage to said screws. The transit of the present invention also is characterized in that the tangent screws of the lower and upper clamps and also for regulating the tilted position of the telescope are, as shown in Figures 5, 13, and 16, of similar construction. The working points of the tangent screws and their cooperating pintles are protected in each instance by cover means forming an integral part of the tangent screw mountings.

Still another feature of the transit is that the several clamps 89, 133, and 277 are of the same general form and are operated by means of a dust-excluding knob, which co-operates with the frame of the clamp in order to prevent injury to the clamping screw.

Among the other important features is the employment of dust-proof means for adjusting the graduated compass ring 207; the utilization of vial and housing constructions and simplified vial adjustment devices in the several spirit levels carried by the compass plate; the employment of novel means for protecting the adjusting screws 41 including the expansible sheet metal casings 61. It will be obvious also that the upper and lower clamps 89 and 133 both co-operate with the clamping ring 83 in order to positively exclude dirt and other foreign matter from gaining entrance to the relatively movable frame 33, sleeve 63, and spindle 65 and that these parts are protected against the entrance of dirt and other foreign matter at their lower ends so that the entire assembly is substantially dust and moisture proof to the end that instruments, made in accordance with my present invention, will give satisfactory service over long periods of time without deterioration of any of their operating parts.

I do not herein claim the enclosed tangent adjusting screw mounting or the operating knobs for the several adjustable control members for the novelty in said mounting and said knobs forms the subject matter of invention claimed in my copending application, Serial No. 202,426, filed April 16, 1938, as a continuation in part of the present application. The novel features of the spirit level and its mounting herein illustrated are also not claimed herein since the same form the subject matter of invention claimed in my copending application, Serial No. 751,241, filed November 2, 1934, now issued as Patent No. 2,101,077 and dated December 7, 1937.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

Having thus described my invention, what I claim as new and desire to secure by Letters Patent is as follows:

1. In a surveying instrument comprising a support standard and instrument-carrying means including a sleeve journalled in said standard and a spindle journalled in said sleeve with the sleeve having a portion projecting from the standard and the spindle projecting from said sleeve, the combination of clamping means for securing the sleeve against rotation with respect to the spindle as well as with respect to the support standard, said carrying means comprising annular means forming a clamp seat on the projecting portion of said sleeve, and encircling an end of said support standard, said clamping means comprising a first clamp having an annular portion encircling a portion of the projecting end of the sleeve and said first clamp having a portion abutting an adjacent portion of the annular means, and a second clamp having an annular portion abutting said support standard and embracing the clamp seat, resilient gasket means between each clamp and said annular element, and resilient gasket means between said first clamp and said sleeve and between said second clamp and said support.

2. In a surveying instrument comprising a support standard providing a journal and rotatable instrument-carrying means carried by said journal and having a portion projecting therefrom, the combination of clamping means for securing the instrument-carrying means against rotation with respect to the support standard, said carrying means comprising annular means forming a clamp seat on the projecting portion of said rotatable carrying means and encircling an end of said journal, said clamping means comprising an annular clamp encircling said annular means in said seat and said clamp abutting portions of said support standard and of said carrying means adjacent and on opposite sides of said seat, and resilient gasket means between said annular clamp and the clamp abutting portions of said support standard and of said carrying means.

3. In a surveying instrument, comprising a support standard providing a journal and rotating instrument carrying means in said journal and having a portion projecting therefrom, the combination of clamping means for securing the instrument carrying means against rotation with respect to the support standard, annular means forming a clamp seat on said projecting portions of the carrying means and encircling an end of said journal, said clamping means comprising an annular clamp encircling said annular means and abutting against portions of said support standard and also abutting against portions of said rotatable carrying means adjacent and on opposite sides of said seat, and resilient gasket means between said clamp and said support standard and between said clamp and said carrying means, said clamp means and said annular means having co-operating shoulders for preventing relative movement therebetween in at least one direction axially of said journal.

4. In a surveying instrument, comprising a support standard providing a journal and rotatable instrument carrying means mounted in said journal and having a portion projecting therefrom, the combination of clamping means for securing the instrument carrying means against rotation with respect to the support standard, said carrying means comprising annular means forming an annular clamp seat on the projecting portion of said carrying means and encircling an end of said journal and said clamping means comprising an annular clamp encircling said annular seat, said support standard and said carrying means forming abutting surfaces with said clamp, and resilient gasket means between said clamp and said support standard and between said clamp and said carrying means for sealing said abutting surfaces.

5. In a surveying instrument, comprising a support standard providing a journal and rotatable instrument carrying means mounted in said journal and having portions projecting therefrom, the combination of clamping means for securing the instrument carrying means against rotation with respect to the support standard, said carrying means comprising annular means forming an annular clamp seat on the projecting portions thereof and encircling an end of said journal, and said clamping means comprising an annular clamp encircling said annular seat, said support standard and said carrying means forming abutting surfaces with said clamp, and resilient gasket means between said clamp and said support standard and between said clamp and said carrying means for sealing said abutting surfaces to prevent entrance of deleterious foreign matter between said clamp and said seat and into the end of said journal from which projects the carrying means, and cover means on the opposite end of said journal for preventing entrance of deleterious foreign matter therethrough.

6. In a surveying instrument, comprising a support standard providing a journal and rotatable instrument carrying means mounted in said journal and projecting therefrom, said carrying means comprising a sleeve mounted in said journal and having end portions projecting therefrom, and a stem mounted in said sleeve and having an end extending from the projecting portions of said sleeve, the combination of interfitting means on the projecting end of said stem and on said projecting portions of the sleeve and forming a running seal therebetween to exclude entrance of foreign matter in said sleeve through the projecting end thereof, and clamping means for securing the carrying means against rotation with respect to the support standard, said sleeve having annular means forming an annular clamp seat on said sleeve and encircling an end of said journal, and said clamping means comprising an annular clamp encircling said annular seat, said support standard and the projecting portions of said sleeve forming surfaces abutting said clamp, and resilient gasket means between said clamp and said support standard and between said clamp and said sleeve for sealing said abutting surfaces on opposite sides of the clamp whereby to exclude foreign matter from entering between the clamp and the clamp seat and from entering the end of the journal from which said sleeve projects.

7. In a surveying instrument, comprising a support standard providing a journal and rotatable instrument carrying means mounted in said journal and projecting therefrom, said carrying means comprising a sleeve mounted in said journal and having end portions projecting therefrom, and a stem mounted in said sleeve and having an end extending from the projecting portions of said sleeve, the combination of interfitting means on the projecting end of said stem and on said projecting portions of the sleeve and forming a running seal therebetween to exclude entrance of foreign matter in said sleeve through the projecting end thereof, and clamping means for securing the carrying means against rotation with respect to the support standard, said sleeve having annular means forming an annular clamp seat on said sleeve and encircling an end of said journal, and said clamping means comprising an annular clamp encircling said annular seat, said support standard and the projecting portions of said sleeve forming surfaces abutting said clamp, and resilient gasket means between said clamp and said support standard and between said clamp and said sleeve for sealing said abutting surfaces on opposite sides of the clamp whereby to exclude foreign matter from entering between the clamp and the clamp seat and from entering the end of the journal from which said sleeve projects, and cover means on the other end of said journal and closing said end against the entrance of deleterious foreign matter therethrough and through the end of said sleeve opposite from the end thereof from which said stem projects.

ADOLPH LANGSNER.